United States Patent
Khan (10) Patent No.: US 11,251,949 B2
(45) Date of Patent: Feb. 15, 2022

(54) BIOMETRIC SECURITY FOR CRYPTOGRAPHIC SYSTEM

(71) Applicant: PIPA SOLUTONS LTD, London (GB)

(72) Inventor: Sher Khan, London (GB)

(73) Assignee: PIPA SOLUTIONS LTD, London (GB)

( * ) Notice: Subject to any disclaimer, the term of this patent is extended or adjusted under 35 U.S.C. 154(b) by 219 days.

(21) Appl. No.: 15/742,031

(22) PCT Filed: Jul. 6, 2016

(86) PCT No.: PCT/GB2016/052034
§ 371 (c)(1),
(2) Date: Jan. 5, 2018

(87) PCT Pub. No.: WO2017/006115
PCT Pub. Date: Jan. 12, 2017

(65) Prior Publication Data
US 2018/0198609 A1    Jul. 12, 2018

(30) Foreign Application Priority Data
Jul. 6, 2015    (GB) .................................. 1511793

(51) Int. Cl.
*H04L 9/08*    (2006.01)
*H04L 9/30*    (2006.01)
*H04L 9/32*    (2006.01)

(52) U.S. Cl.
CPC .......... *H04L 9/0866* (2013.01); *H04L 9/0861* (2013.01); *H04L 9/0869* (2013.01); *H04L 9/3066* (2013.01); *H04L 9/3231* (2013.01); *H04L 9/3247* (2013.01)

(58) Field of Classification Search
CPC ... H04L 9/0866; H04L 9/3066; H04L 9/0869; H04L 9/3247; H04L 9/3231; H04L 9/0861
See application file for complete search history.

(56) References Cited

U.S. PATENT DOCUMENTS 6,393,139 B1     5/2002   Lin et al.
9,407,435 B2 *   8/2016   Li .......................... H04L 9/0866
10,404,465 B2 *  9/2019   Takahashi ........... H04L 63/0861
(Continued)

OTHER PUBLICATIONS

Dao Vu Hiep et al., "A Multibiometric Encryption Key Algorithm Using Fuzzy Vault to Protect Private Key in BioPKI Based Security Systems" 2010 IEEE RIVF, pp. 1-6 (2010).
(Continued)

*Primary Examiner* — Joseph P Hirl
*Assistant Examiner* — Thomas A Gyorfi
(74) *Attorney, Agent, or Firm* — Koffsky Schwalb LLC; Mark I. Koffsky (57) ABSTRACT

A method of storing data allowing a seed value for generating an encryption key to be retrieved is provided. The method comprises obtaining, for each of a plurality of biological data sources, a respective set of biometric data from an authorised user. A respective biometric identifier is generated from each set of biometric data. The biometric identifiers are stored in a database. A plurality of seed portions are generated that are combinable using a function to generate the seed value. Each seed portion is stored in the database in association with a biometric identifier.

13 Claims, 6 Drawing Sheets

(56) References Cited

U.S. PATENT DOCUMENTS

| | | | | |
|---|---|---|---|---|
| 2011/0246768 A1* | 10/2011 | Mahmud | ............... | H04L 9/0866 713/167 |
| 2015/0095654 A1* | 4/2015 | Li | ........................ | H04L 9/0866 713/186 |
| 2016/0105285 A1* | 4/2016 | Jakobsson | ............. | H04L 9/3231 713/186 |
| 2016/0125416 A1* | 5/2016 | Spencer | .................. | G06F 21/73 705/71 |
| 2017/0222809 A1* | 8/2017 | Takahashi | ............... | G06F 21/32 |

OTHER PUBLICATIONS

Yevgeiny Dodis et al., "Fuzzy Extractors: How to Generate Strong Keys from Biometrics and Other Noisy Data", Arvix.org, 201 Olin Library Cornell University (2006).

Li Cai el al., A New Biocryptosystem-Oriented Security Analysis Framework and Implementation of Multibiometric Cryptosystems Based on Decision Level Fusion, IEEE Transactions on Information Forensics and Security, vol. 10, No. 6 (2015).

\* cited by examiner

| Finger 1 | Finger 2 | Finger 3 | Finger 4 | Finger 5 |
|---|---|---|---|---|
| Template 1 | Template 2 | Template 3 | Template 4 | Template 5 |
| 7020002147 | 5963274521 | 9632547633 | 9020085222 | 2212442857 |
| P24781691188 | P26793977429 | P23691583527 | P21639490090 | P28949374040 |
| P35567712103 | P31234485369 | P32692063264 | P30889420653 | P31455191787 |
| P47914396155 | P49091566269 | P48828930473 | P47578128950 | P46717583801 |

| Finger 6 | Finger 7 | Finger 8 | Finger 9 | Finger 10 |
|---|---|---|---|---|
| Template 6 | Template 7 | Template 8 | Template 9 | Template 10 |
| 2774023351 | 2133771982 | 2450635532 | 6659394207 | 4480669503 |
| P24955715784 | P21740592057 | P26389934944 | P20948255752 | P20477914176 |
| P35394367585 | P36282409784 | P37503205302 | P38118744836 | P34211072194 |
| P44436287475 | P42049777046 | P49717058133 | P43871106341 | P42638306555 |

*FIG. 7*

BIOMETRIC SECURITY FOR CRYPTOGRAPHIC SYSTEM

REFERENCE TO RELATED APPLICATIONS

This application is a National Phase Application of PCT International Application No. PCT/GB2016/052034, International Filing Date Jul. 6, 2016, which claims priority to GB 1511793.0, filed Jul. 6, 2015.

BACKGROUND

Asymmetric cryptography, which is also referred to as Public-key cryptography, is a class of cryptographic protocols that use algorithms which require two separate keys. These key pairs consist of a private key, which needs to be kept secret, and a public key which can be displayed and made available to others. While separate, the two keys which form a pair are mathematically linked. For example, the public key can be used to encrypt a plain text message and decrypted by its corresponding private key. Another example would be to generate a digital signature using the private key and for a third party to confirm and verify the signature using the public key. This is why they are referred to as asymmetric, because they perform opposite functions that are the inverse of each other.

Public-key algorithms are based on mathematical problems that need to be solved but currently have no viable efficient solution. Anyone can (computationally) generate their own private/public key pairs for encrypting and decrypting. However, the strength of this system is dependent on its ability to make it impossible (computationally infeasible) to determine a (properly generated) private key from its corresponding public key. This would allow the public key to be made widely available without creating security risk to the privacy of the secret private key.

Public-key algorithms are widely used for security in cryptosystems, applications and protocols. They play a critical role in a number of Internet standards, such as Transport Layer Security (TLS), S/MIME, PGP, and GPG. They are used to provide key distribution and secrecy (e.g., Diffie-Hellman key exchange), as well as digital signatures.

Two of the best-known uses of public-key cryptography are: Public-key encryption and Digital signatures. These will be discussed individually below.

Public-Key Encryption

This is where a confidential message is encrypted with a recipient's public key. The message can only be decrypted by someone who possesses the matching private key. This ensures that only the targeted recipient of the public key is able to access the message, since only the owner of the corresponding private key can decrypt the message.

Digital Signatures

This involves signing a message with the user's private key. This signature can be verified by anyone who has access to the sender's public key. This verification can be used to prove that a message is from a specific sender who had access to the private key, which is paired with the corresponding public key. This is a method of non-repudiable authentication that the sender cannot deny. This form of digital signatures are commonly used for financial transactions.

The problem with this widely used cryptographic system is that it is completely reliant on the ability to keep secure the private-key. This is done by storing the Private-key on a secure server where only the authorised person can access it. The most widely used method for accessing the private-key is a password, which is a very weak and insecure method. The other method is to put it in cold storage, which involves taking the server (or hard drive) off-line. Another alternative is to write it on a piece of paper and lock it in a vault. The last two methods make the fluidity of performing transactions and the flow of information impractical.

The first method, of storing the private-key on a server, that is connected to the internet opens itself up to malicious attacks and theft of private key. The most recent and controversial examples of these have been in the theft of Bitcoins (Crypto-currency) which uses public-key cryptography for digital signature to perform transactions by verifying ownership and then transferring ownership. Significant thefts of Bitcoins have taken place resulting in a price crash of the crypto-currency. These thefts have taken place via the theft of private-keys.

SUMMARY

The present invention provides a method of storing seed portions in a database so that a seed value for generating encryption keys may be retrieved according to claim 1. The present invention also provides a method of obtaining a seed value for generating an encryption key from a database according to claim 12.

The present invention provides a method of creating a database from which a seed value can be repeatably obtained. The user registers a number of biometric identifiers by providing biological data (for example, the user may scan their fingerprints). These biometric identifiers are then stored in a database. The database is further populated with a number of seed value portions (or segments) and each portion is stored in association with one of the biometric identifiers. The portions are combinable to obtain a seed value.

The present invention also provides a method of obtaining a seed value from such a database. The user inputs a sequence of biometric data sets (for example, by providing fingerprint readings). Each set is matched to a biometric identifier from the database (providing a suitable match can be found) to provide a sequence of identifiers that are present in the database. Then, seed portions that are stored in association with each identifier are extracted (in the appropriate order) to provide a sequence of portions. These portions are combined to provide the seed value.

The present invention also provides a method of generating an encryption key. The method comprises creating a database and obtaining a seed value (as described above) and then providing the seed value to a public-key algorithm to generate an encryption key. It may be necessary to divide the seed value into 2 seed values and provide the public-key algorithm with both values, as will be discussed later. Moreover, the algorithm will usually generate a pair of keys (the public key and the private key). If only one of these keys is required (to encrypt, decrypt or sign a message) then the key that is not required will be deleted. Once the required key is finished with, it can also be deleted.

Advantageously, the present invention provides a system for repeatably generating encryption keys. As a result of this, it is not necessary to store the keys. Only the seed portions are stored and it is not easy to obtain the encryption key using these. Knowledge of: what the seed portions are; how the seed portions should be combined; and in which order the seed portions should be combined are all required to obtain the encryption key. Moreover, the system of the present invention only required the user to remember the order in which they should present their biological data sources (for example their fingerprints) in order to generate the correct encryption key.

The authorised user is able to retrieve access the seed value (and hence regenerate the private key) by presenting the biometric identifiers in a known order to repeatable generate the encryption key.

The present invention provides a method of storing data allowing a seed value for generating an encryption key to be retrieved. The method comprises obtaining, for each of a plurality of biological data sources, a respective set of biometric data from an authorised user. For example, the biological data sources may be the user's fingerprints and the data may be obtained by scanning each of the user's fingerprints with a fingerprint scanner.

The method further comprises generating, from each set of biometric data, a respective biometric identifier. These identifiers enable future matching of biological data. In other words, the biometric data source can be scanned a second time and identified as the same source as that which provided the template. For example, in the case of a fingerprint, the user does not have to present the finger in precisely the same position and orientation on the scanner.

The method further comprises storing the biometric identifiers in the database. The database is preferably a secure database so that the data cannot be extracted from the database without authorisation from the user. The database may be a local database or may be a database stored across a network or hosted at a remote location across the internet. It is preferable to store the database locally to reduce the chances of database communication being intercepted. However, if the database is to be stored remotely, it is preferable to provide a secure connection and secure storage at the remote location.

The method further comprises generating a plurality of seed portions that are combinable using a function to generate the seed value. In other words, the method comprises generating portions of data that can be combined and then used as an input to a public-key algorithm (a seed value). These can be obtained by generating an appropriate seed value and splitting it into portions (segments) or these can be generated in other ways. If these are generated in other ways then after they have been combined it may be necessary to perform a function to pad or trim the portions or resulting combination before the result can be used as an input to the algorithm. In other words, the data may need adjusting before it can be used as a seed value.

It is preferable that the seed portions have a high value of data entropy. In other words, they should be obtained from random data. This is to reduce the risk of the encrypted messages being decryptable without the required key, as will be understood by those skilled in the art of public-key encryption.

The method further comprises storing each seed portion in the database in association with a biometric identifier. This allows the seed portion to be retrieved when the user presents a particular biometric source. For example, presenting the third finger on the left hand may allow retrieval of a different seed portion to that which would be retrieved if the user presented the third finger on the right hand, because the biometric identifiers for these fingers will be different.

The method may further comprise receiving a code from the user defining a sequence of the biometric identifiers, wherein a respective one of the plurality of seed portions is generated for each symbol and stored in the database in association with the corresponding biometric identifier. In other words, the user may indicate which biological data sources they intend to use as their code and in what order they are going to input the biological data sources. In this case, the seed portions are stored in association with the appropriate templates.

Alternatively, a respective seed portion may be generated for each biometric identifier. In this case, the system may not need to know what order the user is going to input the biological data sources because the same seed value will be generated as long as the same biological data sources are used in the same order each time. In this case, a seed portion needs to be generated for each biometric identifier so that the user can use any one of the biological data sources.

Generating a plurality of seed portions may comprise generating an intermediate seed value for generating an encryption key using a seed generating function and splitting the intermediate seed value into seed portions. In other words, the seed portions can be obtained by generating an appropriate seed value and splitting it into portions, as mentioned above.

A sequence of alphanumeric characters may be representative of the intermediate seed value and splitting the intermediate seed value into seed portions may comprise separating the sequence of alphanumeric characters into sub-sequences of alphanumeric characters, each sub-sequence being representative of a respective seed portion. In other words, the seed value may be written down as a long alphanumeric string and the portions can be obtained by splitting the string up. Each sub-sequence of alphanumeric characters may have a length equal to a length of the other sub-sequences of alphanumeric characters. Alternatively, the sub-sequences may have different lengths. Examples of how a seed value may be split up are provided in the detailed description.

Generating an intermediate seed value using a seed generating function may comprise obtaining data indicative of a physical property and formatting the data so that it can be used as a seed value for a public-key algorithm. As mentioned above, it is preferable that the seed portions have a high value of data entropy. In order to achieve this, measurements of physical properties may be used. For example, the seed value may be obtained using temperature measurements, hard-disk seek speeds, keystroke timings of user inputs and the like. Additionally or alternatively, biological data from the biological data sources may be used to produce an intermediate seed value. Combinations of data from many different sources may be used.

If the seed portions are generated directly, it is also preferable for them to have high data entropy. Similar methods as those mentioned above may be used to achieve this but the step of generating an intermediate seed value may not be necessary.

The method may further comprise generating one or more dummy seed portions and storing each dummy seed portion in the database in association with a respective one of the biometric identifiers. Moreover, the method may further comprise generating one or more dummy biometric identifiers and storing the dummy biometric identifiers in the database. Dummy seed portions may be stored in association with dummy biometric identifiers. This can be advantageous in the event that the secure database becomes compromised or a fraudster manages to spoof the biological data (for example with false fingerprints). The correct sequence (and knowledge of how to combine the sequence) is still required to obtain the seed value and hence the encryption key. Guessing the correct sequence of seed portions is made more difficult by having more seed portions stored in the database.

The present invention also provides a method of obtaining a seed value for generating an encryption key from a database. The database contains a plurality of biometric identifiers and a plurality of seed portions that can be combined using a function to provide the seed value. Each seed portion is stored in association with a respective one of the plurality of biometric identifiers. In other words, the database is a database that would be created from by performing one of the methods described above.

The method of obtaining a seed value for generating an encryption key from a database comprises obtaining, for each of a sequence of biological data sources, a respective biometric data set from a user, thereby providing a sequence of biometric data sets. In other words, the user presents biological data sources in a certain order and information from each of those sources is obtained. The data may be obtained by scanning the user's fingerprint or recording the user's voice, for example.

The method further comprises matching each of the sequence of biometric data sets to a respective biometric identifier from the database to provide a sequence of biometric identifiers. As mentioned above, this means that the user does not have to present the finger in the same position and orientation each time, for example. Moreover, slight differences in the tone of a user's voice or the presence background noise should not prevent speech recognition from successfully matching a user's voice.

The method further comprises retrieving from the database, for each of the sequence of biometric identifiers, a respective seed portion stored in association with the biometric identifier to provide a sequence of seed portions. The method further comprises combining the sequence of seed portions using a function to provide the seed value, wherein the function is non-commutative. As discussed above, the seed portions may be combined to create seed values in a number of ways. The function to combine the seed portions must be non-commutative so that inputting the correct segments but in the incorrect order does not result in the generation of the correct seed value.

The sequence of biological data sources may contain at least two distinct biological data sources. It is preferable that multiple different data sources be used to improve security. However, the user's code could be the same fingerprint multiple times, for example. Moreover, the user's code may use a plurality of distinct sources and may also include the same source more than once. An example of this is provided in the detailed description.

Each position in the sequence of seed portions may be assigned a predetermined multiplier and combining the seed portions using a function may comprise multiplying each seed portion by the predetermined multiplier. In this way, a different value is produced depending on the position of the seed portion in the code. This ensures the function is non-commutative. Combining the seed portions using a function may then comprises adding the seed portions. A non-commutative operation may be used to combine since non-commutativity is provided by the position-specific multipliers.

Combining the seed portions using a function may alternatively comprise concatenating the seed portions. This operation is non-commutative and so no multiplication is required to ensure the function is non-commutative. However, the seed portions may be multiplied by position-specific factors nevertheless.

Two or more seed portions may be stored in association with a single biometric identifier. Retrieving a seed portion from the database stored in association the particular biometric identifier may then comprise determining which seed portion to retrieve based on a position of the biometric identifier in the sequence of biometric identifiers. In other words, the seed portion retrieved by presenting a particular biological data source can change, depending on what position in the sequence that data source appears. For example, presenting the second finger of the right hand can result in retrieval of a segment of 4889907080 if presented in the first position and a segment of 1898014581 if presented in the second position in the sequence.

Determining which seed portion to retrieve based on a position of the biometric identifier in the sequence of biometric identifiers may further comprise retrieving a seed portion that contains an indication of the position. As discussed below, the seed portion can contain an indication of its expected position in the sequence. For example, P21898014581 may be returned in the second position. The indication of the position may then be removed to leave 1898014581.

A method of generating an encryption key is also provided. The method comprises storing data in a database by a method as described above and obtaining a seed value from the database by a method as described above. The method further comprises generating the encryption key from the seed value. This can be performed in a number of different ways. For example, this may be performed using a public-key algorithm such as the elliptic curve cryptography (ECC) public-key algorithm.

Biometric data may be obtained via one or more of:
a fingerprint scan;
finger vein scan;
a palm vein scan;
an iris scan;
a facial scan; and
a voice scan.

The present invention also provides an electronic device comprising a processor configured to perform a method as described above. The present invention also provides a software program configured to perform a method described above when executed on a processor of an electronic device.

CLAUSES

A number of clauses providing implementations of the present invention are provided below.

1. A method for generating a cryptographic key for use in performing a cryptographic operation, the method comprising:
receiving first biometric input data;
obtaining first segment data associated with the first biometric input data;
receiving second biometric input data;
obtaining second segment data associated with the second biometric input data;
generating the cryptographic key using at least the first segment data and the second segment data.

2. The method of clause 1, wherein the second biometric input data is received after the first biometric input data.

3. The method of any preceding clause, wherein:
the cryptographic key is generated using at least one non-commutative operation, wherein a first input to the non-commutative operation is based at least in part on the first segment data and a second input to the non-commutative operation is based at least in part on the second segment data.

4. The method of clause 3, wherein:
the cryptographic key is generated using at least the first segment data, the second segment data and at least one of a first value and a second value; and wherein
the first value is associated with the biometric input data that is received first; and wherein
the second value is associated with the biometric input data that is received second.

5. The method of clause 4, wherein the non-commutative operation comprises modifying the first segment data using the first value, and modifying the second segment data using the second value.

6. The method of clause 5, wherein the non-commutative operation comprises multiplying the first segment data with the first value, and multiplying the second segment data with the second value.

7. The method of any of clauses 3 to 6, wherein the non-commutative operation comprises at least one of:
concatenation of data based at least in part on the first segment data and data based at least in part on the second segment data;
subtraction of data based at least in part on the first segment data from data based at least in part on the second segment data;
subtraction of data based at least in part on the second segment data from data based at least in part on the first segment data;
division of data based at least in part on the first segment data by data based at least in part on the second segment data;
division of data based at least in part on the second segment data by data based at least in part on the first segment data;
addition of data based at least in part on the first segment data and data based at least in part on the second segment data; and/or
multiplication of data based at least in part on the first segment data and data based at least in part on the second segment data.

8. The method of any preceding clause, further comprising:
receiving third biometric input data;
obtaining third segment data associated with the third biometric input data; and
generating the cryptographic key using at least the first segment data, the second segment data and the third segment data.

9. The method of any preceding clause, wherein:
the first biometric input data corresponds to at least one of a first fingerprint scan, a first palm print scan, a first facial-scan, a first finger vein scan, a first palm vein scan, a first iris-scan and/or a first voice-scan; and wherein:
the second biometric input data corresponds to at least one of a second fingerprint scan, a second palm print scan, a second facial-scan, a second finger vein scan, a second palm vein scan, a second iris-scan and/or a second voice-scan.

10. The method of any preceding clause, wherein the first biometric input data is different to the second biometric input data.

11. An electronic device comprising:
a memory; and
a processor configured to perform the method of any of clauses 1 to 10.

12. A software program configured to perform the method of any of clauses 1 to 10 when executed on a processor of an electronic device.

13. A method for configuring an electronic device to generate a cryptographic key, wherein the electronic device is suitable for receiving input biometric data, the method comprising:
storing first segment data in memory with an association to a first biometric template;
storing second segment data in memory with an association to a second biometric template; and
configuring the electronic device to generate the cryptographic key using at least the first segment data and the second segment data after receiving first biometric input data corresponding to the first biometric template and second biometric input data corresponding to the second biometric template.

14. The method of clause 13, further comprising:
generating an intermediate value;
generating the first segment data using at least part of the intermediate value; and
generating the second segment data using at least part of the intermediate value.

15. The method of clause 14, wherein the first segment data comprises a portion of the intermediate value and the second segment data comprises a different portion of the intermediate value.

16. The method of either clause 14 or clause 15, wherein the intermediate value is generated using at least a random, or pseudo-random, number generation algorithm.

17. The method of any of clauses 14 to 16, wherein the intermediate value is generated using at least one of the first biometric template and/or the second biometric template.

18. The method of any of clauses 13 to 17, wherein the electronic device is configured to generate the cryptographic key using at least one non-commutative operation, wherein a first input to the non-commutative operation is based at least in part on the first segment data and the second input to the non-commutative operation is based at least in part on the second segment data.

19. The method of clause 18, wherein the non-commutative operation comprises at least one of:
concatenation of data based at least in part on the first segment data and data based at least in part on the second segment data;
subtraction of data based at least in part on the first segment data from data based at least in part on the second segment data;
subtraction of data based at least in part on the second segment data from data based at least in part on the first segment data;
division of data based at least in part on the first segment data by data based at least in part on the second segment data;
division of data based at least in part on the second segment data by data based at least in part on the first segment data;
addition of data based at least in part on the first segment data and data based at least in part on the second segment data; and/or
multiplication of data based at least in part on the first segment data and data based at least in part on the second segment data.

20. The method of any of clauses 13 to 19, further comprising:
storing a first value in memory;
storing a second value in memory, and
configuring the electronic device to generate the cryptographic key at least in part by:

modifying, using the first value, the segment data associated with the biometric input data that are received first; and modifying, using the second value, the segment data associated with the biometric input data that are received second.

21. The method of any of clauses 13 to 20, further comprising:

storing third segment data in memory with an association to a third biometric template; and configuring the electronic device to generate the cryptographic key using at least the first segment data, the second segment data and the third segment data after receiving first biometric input data corresponding to the first biometric template, second biometric input data corresponding to the second biometric template, and third biometric input data corresponding to the third biometric template.

22. The method of any of clauses 13 to 21, wherein:

the first biometric template corresponds to at least one of a first fingerprint scan, a first palm print scan, a first facial-scan, a first finger vein scan, a first palm vein scan, a first iris-scan or a first voice-scan; and wherein the second biometric template corresponds to at least one of a second fingerprint scan, a second palm print scan, a second facial-scan, a second finger vein scan, a second palm vein scan, a second iris-scan or a second voice-scan.

23. An electronic device comprising:

a memory; and a processor configured to perform the method of any of clauses 13 to 22.

24. A software program configured to perform the method of any of clauses 13 to 22 when executed on a processor of an electronic device.

DETAILED DESCRIPTION

The Solution

The solution is the use of a biometrics in a secret order of sequence to negate the need to store, memorise or put into cold-storage the private-key, since this is the Achilles-heel in the cryptographic system. This is achieved by generating the private-key on the fly at the point of use. The result is that the private-key is invisible and tied to the biometric features of the individual user and their knowledge of a secret sequence.

Cryptography relies upon two basic components: an algorithm (or cryptographic methodology) and a cryptographic key. The algorithm is a mathematical function, and the key is a parameter used by that function. The generation of the private/public key is determined by an input seed (or a combination of input seeds). The input seed/s needs to be a random number and be of a sufficient length. Once the input seed is created and put into the public-key algorithm, two keys are generated. One is a private-key and the other public key.

The important point to note is that for a significant number of widely used asymmetric cryptographic algorithms, the private and public keys will always be the same if the input seed (or a combination of input seeds) is the same one used to generate the key in the first instant. The input seed/s would be too long to memorise and un-safe to store. In our method the input seed would be split into several parts with each part being tied to a different biometric feature (e.g. fingerprints). The input seed/s would then be created on the fly and at the point of use by inputting the biometric feature (e.g. fingerprint) in a specific order known only to the user. Each biometric feature would provide only part of the intermediate input seed ingredient until the full input seed is created. The full input seed/s would only be correct if the different parts are in the correct order, which is entirely dependent on the order of input of the biometric feature.

Example 1

Generating Private and Public Key

Step 1: Register Fingerprints

Scan each of the user's fingerprints, which will result in:

Finger 1=Template 1; Finger 2=Template 2; Finger 3=Template 3; Finger 4=Template 4; Finger 5=Template 5; Finger 6=Template 6;

Finger 7=Template 7; Finger 8=Template 8; Finger 9=Template 9; Finger 10=Template 10

Step 2: Store all the fingerprint templates in a secure database.

Figure 3:
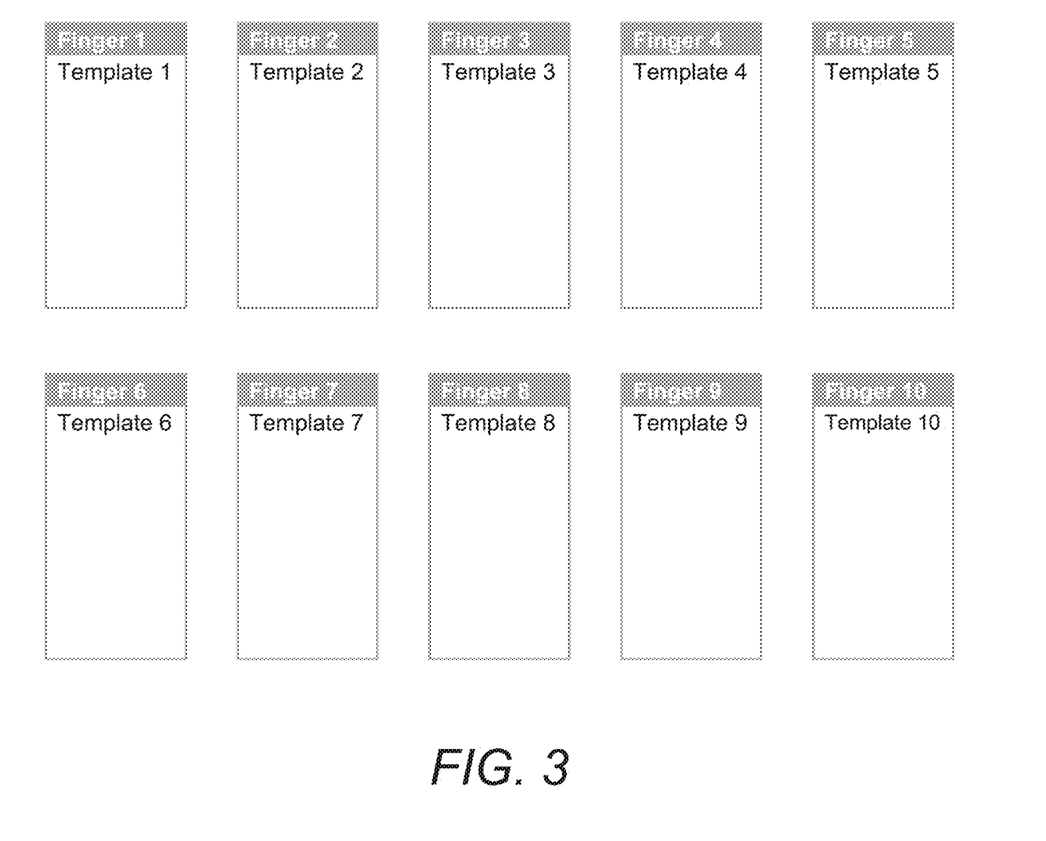
FIG. 3 shows fingerprint templates in a secure database.

This step is shown in FIG. 3.

Step 3: Create and register an order of sequence for input of fingerprints

Secret sequence known only to the user:

First position (P1)=Finger 2 (Template 2)

Second Position (P2)=Finger 3 (Template 3)

Third Position (P3)=Finger 8 (Template 8)

Fourth Position (P4)=Finger 1 (Template 1)

Step 4: Give each sequence position a fixed number, which are stored in memory with an association to the sequence position.

First position=n1=5023

Second Position=n2=68

Third Position=n3=7899

Fourth Position=n4=555

The fixed numbers can be alphanumeric and of varying length

Step 5: Generate an intermediate seed

The random intermediate seed=59632745219632547633123448536970200021 47 (This could also be alpha-numeric)

Step 6: Split the intermediate seed into four segments:

Segment 1 (S1)=5963274521

Segment 2 (S2)=9632547633

Segment 3 (S3)=1234485369

Segment 4 (S4)=7020002147

Step 7: Associate each segment with fingerprint

Each segment of the intermediate seed will be associated with a fingerprint. The order of association will be determined by the order of position in the sequence.

First position (P1)=Finger 2 (Template 2)=5963274521

Second Position (P2)=Finger 3 (Template 3)=9632547633

Third Position (P3)=Finger 8 (Template 8)=1234485369

Fourth Position (P4)=Finger 1 (Template 1)=7020002147

Figure 1:
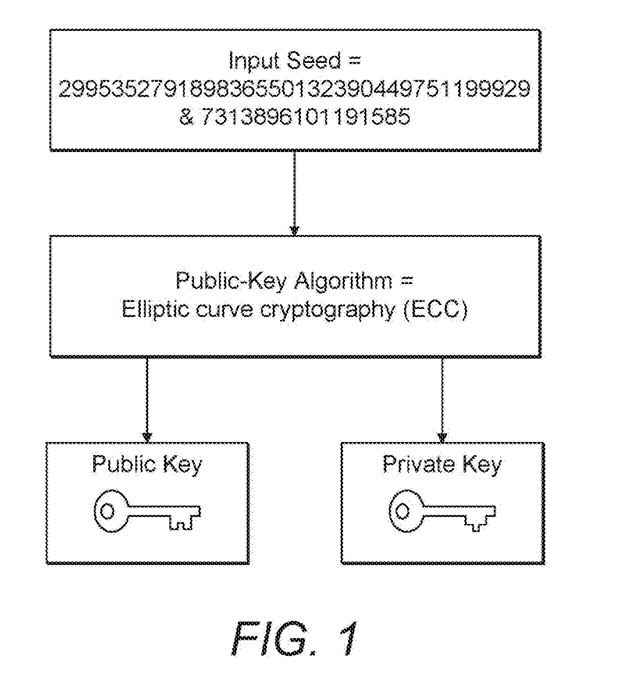
FIG. 1 shows a pair of public and private keys being generated from a seed value using a public-key algorithm.
Figure 2:
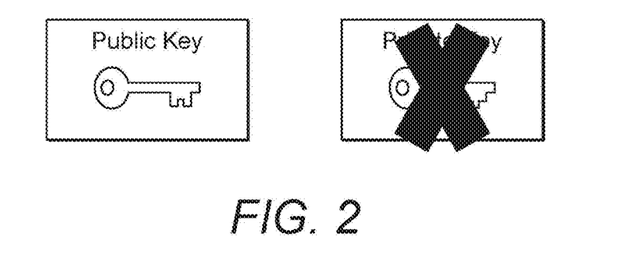
FIG. 2 shows the private key being deleted.
Figure 4:
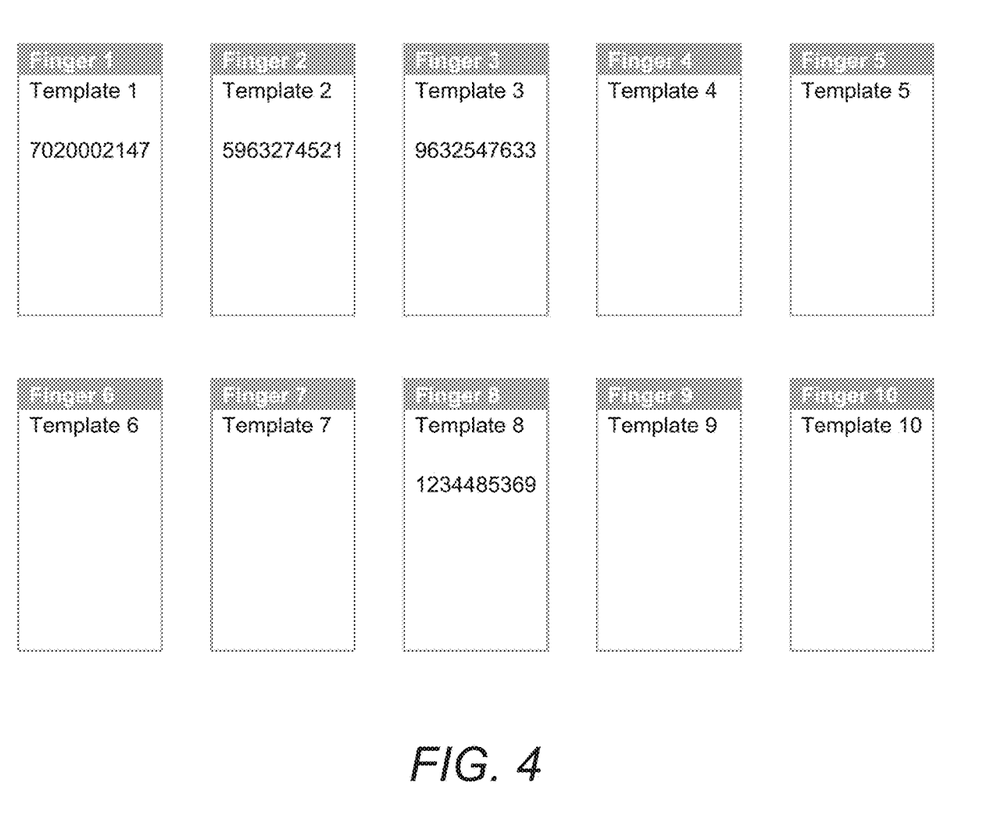
FIG. 4, FIG. 5, FIG. 6, and FIG. 7 show examples of additional data stored in a secure database along with the fingerprint templates.

Step 8: Store the results of steps 1; 2; 3; 5; 6; 7 in a secure database
This step is shown in FIG. 4.
Step 9: Generate input seeds for Public-Key Algorithm
Perform Function 1:
Take the fixed number associated with the finger position and multiply with number associated with the relevant segment. In our example this would be:
n1×S1
n2×S2
n3×S3
n4×S4
Which equals:

$$5023 \times 5963274521 = 29953527918983$$

$$68 \times 9632547633 = 655013239044$$

$$7899 \times 1234485369 = 9751199929731$$

$$555 \times 7020002147 = 3896101191585$$

Perform Function 2:
Concatenate each of the results to form the input seed
29953527918983 & 655013239044 & 9751199929731 & 3896101191585=29953527918983655013239044975119 9929731 3896101191585
Perform Function 3:
Split the input seed into two to create final input into the Public-key algorithm
29953527918983655013239044 9751199929 & 7313896101191585
Step 10: Generate the Private & Public Key
Public-key algorithm=Elliptic curve cryptography (ECC) (although it will be appreciated that any type of public-key algorithm may be used)
This step is shown in FIG. 1.
Step 11: Delete Private Key & Distribute Public Key
This step is shown in FIG. 2.
There is no need to save or store the private key anywhere since it can be generated at the point of use.
Executing a Digital Signature in an Asymmetric Cryptographic System
Step 1: Place finger on scanner in secret order of original sequence
Finger 2 placed on scanner in first position (P1)=this generates finger print template
Result: P1=Template 2
Finger 3 placed on scanner in second position (P2)=this generates finger print template
Result: P2=Template 3
Finger 8 placed on scanner in third position (P3)=this generates finger print template
Result: P3=Template 8
Finger 1 placed on scanner in fourth position (P4)=this generates finger print template
Result: P4=Template 1
Step 2: Search and match fingerprint templates in database to receive corresponding raw segment data needed to generate input seed.
Search Template 2=5963274521
Search Template 3=9632547633
Search Template 8=1234485369
Search Template 1=7020002147
Step 3: Perform function/s on segment data to generate Input Seeds
Perform Function 1:
Take the fixed number associated with the finger position and multiply with number associated with the relevant segment. In our example this would be:
n1×S1
n2×S2
n3×S3
n4×S4
Which equals:

$$5023 \times 5963274521 = 29953527918983$$

$$68 \times 9632547633 = 655013239044$$

$$7899 \times 1234485369 = 9751199929731$$

$$555 \times 7020002147 = 3896101191585$$

Perform Function 2:
Concatenate each of the results to form the input seed
29953527918983 & 655013239044 & 9751199929731 & 3896101191585=29953527918983655013239044975119 9929731 3896101191585
Perform Function 3:
Split the input seed into two to create final input into the Public-key algorithm
29953527918983655013239044 9751199929 & 7313896101191585
With each scan of a fingerprint a part of the intermediate seed is revealed. Only if the correct fingerprints are scanned in a specific order, known only to the user, will the correct input seed be generated.
Step 4: Submit input seeds to generate Private Key
Public-key algorithm=Elliptic curve cryptography (ECC)
This step is shown in FIG. 1.
If fingerprints were scanned in the wrong order of sequence this would result in the creation of an incorrect input seed. This would in turn result in unsuccessful generation of the correct Private-key.
Step 5: Use Private Key to perform digital signature
S:=σ(Private Key, M)
Where S=digital signature
M=message
If S & M are made public with the public key, a verification function can be performed to authenticate the digital signature.
V (Public Key, M, S)
Step 6: Delete Private key
This step is shown in FIG. 2.

Example 2

In this example one finger is used twice in a sequence length of four. Any finger can be used more than once in a given sequence length.
Generating Private and Public Key
Step 1: Register Fingerprints
Scan each of the user's fingerprints, which will result in:
Finger 1=Template 1; Finger 2=Template 2; Finger 3=Template 3;
Finger 4=Template 4; Finger 5=Template 5; Finger 6=Template 6;
Finger 7=Template 7; Finger 8=Template 8; Finger 9=Template 9;
Finger 10=Template 10
Step 2: Store all the fingerprint templates in a secure database.
This step is shown in FIG. 3.
Step 3: Create and register an order of sequence for input of fingerprints
Secret sequence known only to the user:
First position (P1)=Finger 2 (Template 2)
Second Position (P2)=Finger 3 (Template 3)
Third Position (P3)=Finger 2 (Template 2)
Fourth Position (P4)=Finger 1 (Template 1)

Step 4: Give each sequence position a fixed number
First position=n1=5023
Second Position=n2=68
Third Position=n3=7899
Fourth Position=n4=555

The fixed numbers can be alphanumeric and of varying length

Step 5: Generate an intermediate seed
The random intermediate seed=5963274521963254763312344853697020002147 (this could also be alpha-numeric).

Step 6: Split the intermediate seed into four segments:
Segment 1 (S1)=5963274521
Segment 2 (S2)=9632547633
Segment 3 (S3)=1234485369
Segment 4 (S4)=7020002147

Step 7: Associate each segment with fingerprint
Each segment of the intermediate seed will be associated with a fingerprint. The order of association will be determined by the order of position in the sequence. When a finger is used for a second or more time in a sequence then the position reference will be in front of the segment. For example Third position (P3) and Segment 3 (1234485369) will result in P31234485369.

First position (P1)=Finger 2 (Template 2)=5963274521
Second Position (P2)=Finger 3 (Template 3)=9632547633
Third Position (P3)=Finger 2 (Template 2)=P31234485369
Fourth Position (P4)=Finger 1 (Template 1)=7020002147

Figure 5:
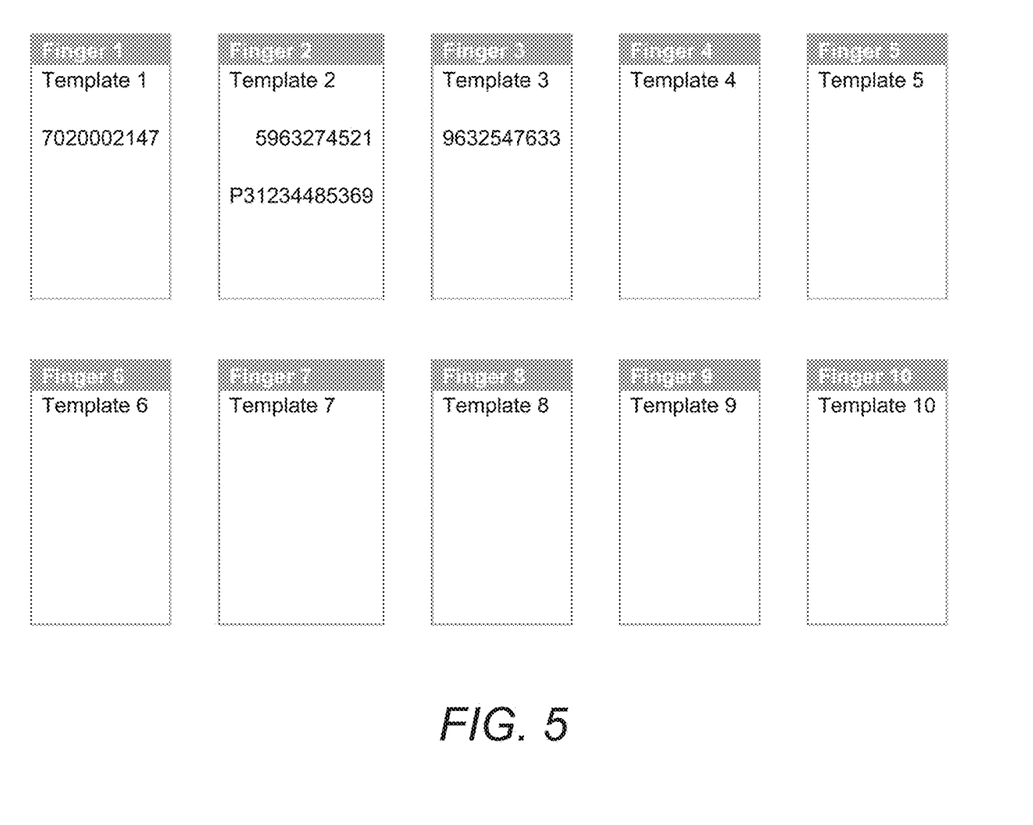

Step 8: Store the results of steps 1; 2; 3; 5; 6; 7 in a secure database
This step is shown as FIG. 5.

Step 9: Generate input seeds for Public-Key Algorithm
Perform function 1:
Take the fixed number associated with the finger position and multiply with number associated with the relevant segment. In our example this would be:
n1×S1
n2×S2
n3×S3
n4×S4
Which equals:

$$5023 \times 5963274521 = 29953527918983$$

$$68 \times 9632547633 = 655013239044$$

$$7899 \times 1234485369 = 9751199929731$$

$$555 \times 7020002147 = 3896101191585$$

Perform Function 2:
Concatenate each of the results to form the final input seed
29953527918983 & 655013239044 & 9751199929731 & 3896101191585=29953527918983655013239044975119 99297313896101191585

Perform Function 3:
Split the input seed into two to create final input into the Public-key algorithm
29953527918983655013239044975119 9929 & 7313896101191585

Step 10: Generate the Private & Public Key
Public-key algorithm=Elliptic curve cryptography (ECC) (although it will be appreciated that any type of public-key algorithm may be used)
This step is shown in FIG. 1.

Step 11: Delete Private Key & Distribute Public Key
This step is shown in FIG. 2.
There is no need to save or store the private key anywhere since it can be generated at the point of use.

Executing a digital signature in an asymmetric cryptographic system
Step 1: Place finger on scanner in secret order of original sequence
Finger 2 placed on scanner in first position (P1)=this generates finger print template
Result: P1=Template 2
Finger 3 placed on scanner in second position (P2)=this generates finger print template
Result: P2=Template 3
Finger 2 placed on scanner in third position (P3)=this generates finger print template
Result: P3=Template 2
Finger 1 placed on scanner in fourth position (P4)=this generates finger print template
Result: P4=Template 1

Step 2: Search and match fingerprint templates in database to receive corresponding raw segment data needed to generate input seed.
Search Template 2=5963274521 & P31234485369
Search Template 3=9632547633
Search Template 2=5963274521 & P31234485369
Search Template 1=7020002147

A Sorting Logic will be applied:
If more than one segment is returned for a position then priority is given to segments with "P".
If "P" is in the segment then the correct position (e.g. P1) must be in initial part of any segment for it to be accepted and the first two characters of the segment will be deleted from the segment.
If the position does not match the initial characters in the segment then it will be rejected and priority will be given to the next segment with a "P". If there are no position matches then the remaining segment without a "P" will be accepted.
If there are no "P" in the segment it will be accepted without any alteration to the segment.

Applying the Sorting Logic to first position P1:
P31234485369 is given priority because it has "P". But "P1" is not in the first two characters of the segment and therefore it is rejected.
Because there is no "P", P1=5963274521
Appling the logic to second position P2:
There is no "P" so P2=9632547633
Appling the logic to third position P3:
Where P3=5963274521 & P31234485369
P31234485369 is given priority because it has "P". And P3 is in the first two characters of the segment and therefore P3=1234485369
Appling the logic to fourth position P4:
There is no "P" so P4=7020002147

Step 3: Perform function/s on segment data to generate Input Seeds
Perform function 1:
Take the fixed number associated with the finger position and multiply with number associated with the relevant segment. In our example this would be:
n1×S1
n2×S2
n3×S3
n4×S4

Which equals:

$$5023 \times 5963274521 = 29953527918983$$

$$68 \times 9632547633 = 655013239044$$

$$7899 \times 1234485369 = 9751199929731$$

$$555 \times 7020002147 = 3896101191585$$

Perform Function 2:

Concatenate each of the results to form the final input seed 29953527918983 & 655013239044 & 9751199929731 & 3896101191585=299535279189836550132390449751199929731 3896101191585

Perform Function 3:

Split the input seed into two to create final input into the Public-key algorithm

299535279189836550132390449751199929 & 7313896101191585

With each scan of a fingerprint a part of the intermediate seed is revealed. Only if the correct fingerprints are scanned in a specific order, known only to the user, will the correct input seed be generated.

Step 4: Submit input seeds to generate Private Key

Public-key algorithm=Elliptic curve cryptography (ECC)

This step is shown in FIG. 1.

If fingerprints were scanned in the wrong order of sequence this would result in the creation of an incorrect input seed. This would in turn will result in unsuccessful generation of the correct Private-key.

Step 5: Use Private Key to perform digital signature

S:=σ(Private Key, M)

Where S=digital signature

M=message

If S & M are made public with the public key, a verification function can be perform to authenticate the digital signature.

V (Public Key, M, S)

Step 6: Delete Private key

This step is shown in FIG. 2.

The above methods can have further variations:

Biometric Features

Biometric features are not limited to fingerprints. It is entirely possible to use this method/solution with other biometric features or a combination of biometric features. These biometric features could be, but not limited to facial-scan, finger vein, palm vein, iris-scan and voice. So you could have a scenario where the first input is a palm-scan, second input is a finger vein, third input is facial scan and finally the fourth input is an iris-scan. Again it is the order of sequence which is important.

Dummy Seed Segments

Figure 6:
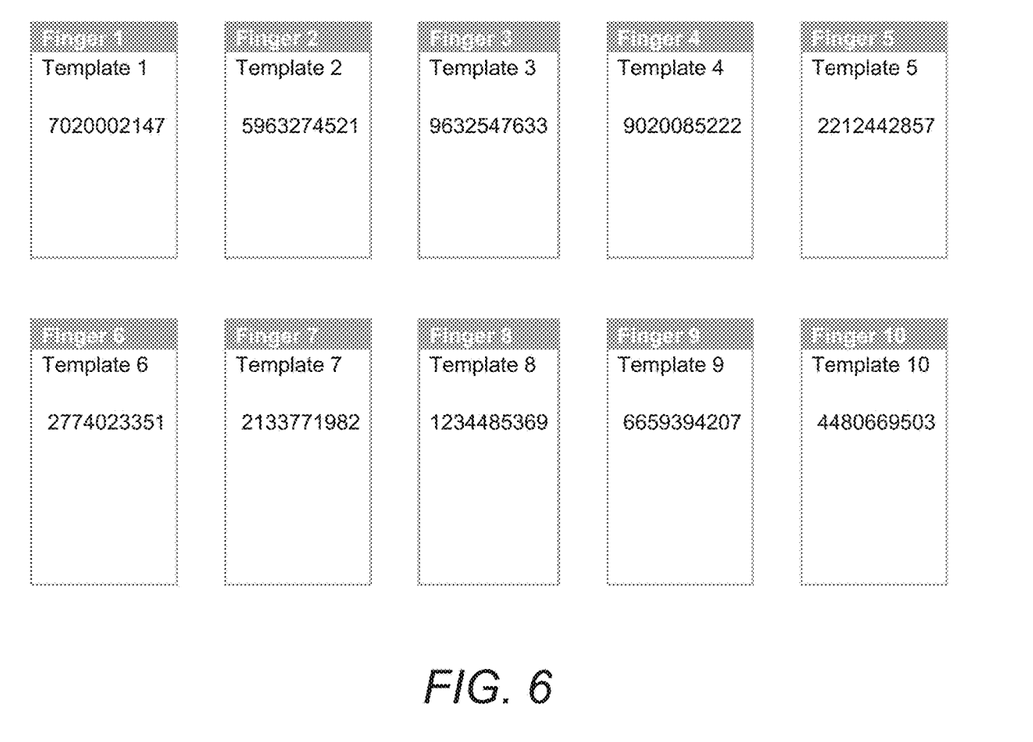

It may also be advantageous to generate and store additional seed segments in the parts of the database that have not already been populated with seed segments. An example database shown in FIG. 6 (modified from Example 1) could then contain a seed portion for additional finger templates. This could be some additional templates or could be every template (as shown below).

This can be advantageous in the event that the secure database becomes compromised or a fraudster manages to spoof the biological data (for example with false fingerprints). The correct sequence (and knowledge of how to combine the sequence) is still required to obtain the seed value and hence the encryption key. Guessing the correct sequence of seed segments is made more difficult by having more seed segments stored in the database.

Figure 7:
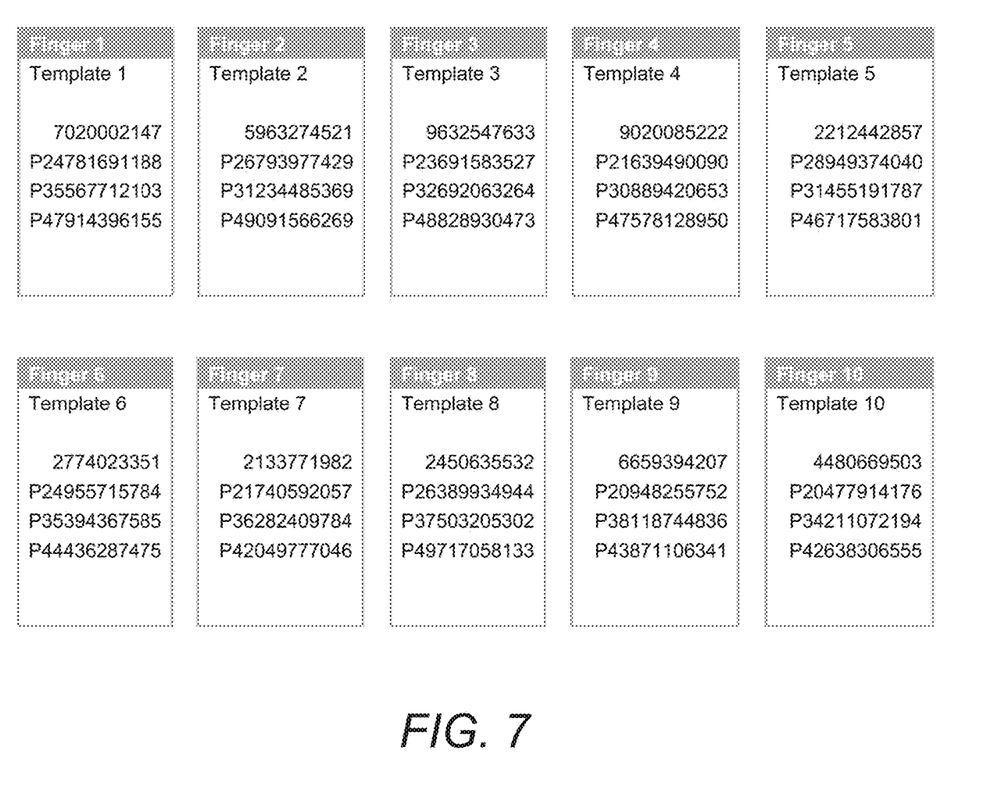

Moreover, since multiple fingers can be used more than once in the same sequence, further additional seed segments may be added to the database as shown in FIG. 7 (modified from Example 2).

This may further enhance the difficulty in guessing the correct sequence.

Dummy Biometric Templates

To make guessing the correct sequence harder still, dummy templates may be added to the database. These dummy templates may have still further dummy seed segments associated with them to further decrease the chances of a sequence being correctly guessed if the database becomes compromised.

No Input Sequence Required

In some implementations the user does not need to register a particular input sequence beforehand. The user may provide biometric information relating to a series of sources (for example, 10 fingerprints). The system will generate templates store these in the tables populated with seed portions then. A fixed input sequence will repeatably generate an encryption key. Therefore, it may not be necessary to register the sequence beforehand but only generate the key on the fly (and rely on the fact that the same key will be generated each time). If an incorrect sequence is entered then the system will generate an incorrect encryption key and security will not be compromised.

Biometric Intermediate Seed

One method of creating an intermediate seed is through random number generation, as discussed above. An alternative is to use the digital templates derived from biometric features themselves. This would make the intermediate seed unique, random and non-repudiable. The intermediate seed can also be a portion of the whole digital template (derived from biometric features like fingerprints).

Another variation is that instead of generating one random intermediate seed and splitting it into several parts for each finger, a random intermediate seed can be generated for each finger. In this way, each fingerprint template will have an associated randomly generated intermediate input seed.

Method or Function Applied to Segment Data for Generating Input Seed

This variation will be the same for step 9 in "Generating Private and Public Key" and Step 3 in "Executing a digital signature in an asymmetric cryptographic system".

Variation 1

Carry out entire Step 9/Step 3 and then add a fixed alphanumeric key

Alphanumeric Key=12rt888J (for example)

299535279189836550132390449751199929731389610 1191585 & 12rt888J=299535279189836550132390449 7511999297313896101191585 12rt888J

Variation 2

Take the fixed number associated with the finger position and multiply with number associated with the relevant segment. In our example this would be:

n1×S1 n2×S2 n3×S3 n4×S4

Which equals:

$$5023 \times 5963274521 = 29953527918983$$

$$68 \times 9632547633 = 655013239044$$

$$7899 \times 1234485369 = 9751199929731$$

$$555 \times 7020002147 = 3896101191585$$

Sum the outputs (rather than concatenate):
29953527918983+655013239044+9751199929731+3896101191585=44255842279343

Additionally, or alternatively, one or more other mathematical functions may be performed on the segment data (and/or data based at least in part on the segment data) to generate the input seed. Is it required that the function be non-commutative to generate the input seed, but may involve commutative operations. For example one or more of addition, subtraction, division, multiplication, concatenation, etc. may be used.

In the example given above, the modified seed segments are summed together. Addition is a commutative operation. However, the overall function to combine the segments to generate the input seed is non-commutative. This is because each segment is multiplied by a different factor, depending on the position of the segment in the sequence. Indeed the factors could be chosen so that the function is equivalent to concatenation by setting the factors in the following way.

$n1=10^{30}$
$n2=10^{20}$
$n3=10^{10}$
$n4=1$

Other Variations

Apply numerous mathematical functions to segment data.

Example 1

The seed value could be formed by taking the Log of each output and apply addition or concatenation:

$$\text{Log}(n1 \times S1) + \text{Log}(n2 \times S2) + \text{Log}(n3 \times S3) + \text{Log}(n4 \times S4)$$

Example 2

Another alternative could be to concatenate (or perform any other non-commutative operation on) the segment data to arrive directly at the input seed (i.e., not having to multiply each item of segment data with the associated fixed number n1-n4):

Concatenate (S1) & (S2) & (S3) & (S4)
5963274521 & 9632547633 & 1234485369 & 7020002147=5963274521963254763312344853697020002147

Or the Log values of the segments could be concatenated:
Log(S1) & Log(S2) & Log(S3) & Log(S4)
Segmenting the Intermediate Seed
This applies to Step 6 in "Generating Private and Public Key"
Split the intermediate seed into four segments:
Segment 1 (S1)=5963274521
Segment 2 (S2)=9632547633
Segment 3 (S3)=1234485369
Segment 4 (S4)=7020002147
The segment lengths do not have to be the same number of digits. They can vary in length.

Example

Segment 1 (S1)=59632745
Segment 2 (S2)=219632547633
Segment 3 (S3)=12344
Segment 4 (S4)=853697020002147

OTHER SCENARIOS

Biometric Input Devices:
Fingerprint readers; Iris scanners; Palm vein readers; Finger vein readers, Facial recognition cameras.
Random number generation can be through any algorithm.
In the above examples, the sequence length is four. However, the above described processes may be applied to biometric sequences of any length of two or more.

The invention claimed is:

1. A method of storing data allowing a seed value for generating an encryption key to be retrieved, the method comprising:
   obtaining, for each of a plurality of biological data sources, a respective set of biometric data from an authorized user;
   generating, from each set of biometric data, a respective biometric identifier;
   storing the biometric identifiers in a database;
   generating a plurality of seed portions that are combinable using a non-commutative function to generate the seed value, wherein generating a plurality of seed portions comprises generating an intermediate seed value for generating an encryption key using a seed generating function and splitting the intermediate seed value into seed portions, wherein a sequence of alphanumeric characters is representative of the intermediate seed value and splitting the intermediate seed value into seed portions comprises separating the sequence of alphanumeric characters into sub-sequences of alphanumeric characters, each sub-sequence being representative of a respective seed portion; and
   storing each seed portion in the database in association with a biometric identifier,
   receiving a code from the user defining a sequence of the biometric identifiers, wherein a respective one of the plurality of seed portions is generated for each symbol and stored in the database in association with the corresponding biometric identifier.

2. The method of claim 1, wherein a respective seed portion is generated for each biometric identifier.

3. The method of claim 1, wherein each sub-sequence of alphanumeric characters has a length equal to a length of the other sub-sequences of alphanumeric characters.

4. The method of claim 1, wherein generating an intermediate seed value using a seed generating function comprises obtaining data indicative of a physical property and formatting the data so that it can be used as a seed value for a public-key algorithm.

5. The method of claim 4, wherein the physical property is keystroke timings of user inputs.

6. The method of claim 4, wherein the physical property is a portion of the sets of biometric data.

7. The method of claim 4, further comprising generating one or more dummy seed portions and storing each dummy seed portion in the database in association with a respective one of the biometric identifiers.

8. The method of claim 7, further comprising generating one or more dummy biometric identifiers and storing the dummy biometric identifiers in the database, wherein at least one dummy seed portion is stored in association with a dummy biometric identifier.

9. A method of obtaining a seed value for generating an encryption key from a database, wherein the database contains a plurality of biometric identifiers and a plurality of seed portions that can be combined using a function to provide the seed value, each seed portion being stored in association with a respective one of the plurality of biometric identifiers, the method comprising:

obtaining, for each of a sequence of two or more biological data sources, a respective biometric data set from a user, thereby providing a sequence of biometric data sets;

matching each of the sequence of biometric data sets to a respective biometric identifier from the database to provide a sequence of biometric identifiers;

retrieving from the database, for each of the sequence of biometric identifiers, a respective seed portion stored in association with the biometric identifier to provide a sequence of seed portions; and combining the sequence of seed portions using a function to provide the seed value, wherein the function is non-commutative, wherein combining the seed portions using a function comprises concatenating the seed portions.

10. The method of claim 9, wherein the sequence of two or more biological data sources contains at least two distinct biological data sources.

11. The method of claim 9, wherein each position in the sequence of seed portions is assigned a predetermined multiplier and combining the seed portions using a function comprises multiplying each seed portion by the predetermined multiplier.

12. The method of claim 9, wherein at least two seed portions are stored in association with a particular biometric identifier and wherein retrieving a seed portion from the database stored in association the particular biometric identifier further comprises determining which seed portion to retrieve based on a position of the biometric identifier in the sequence of biometric identifiers.

13. The method of claim 12, wherein determining which seed portion to retrieve based on a position of the biometric identifier in the sequence of biometric identifiers comprises retrieving a seed portion that contains an indication of the position.

* * * * *